United States Patent
Kitamura

(10) Patent No.: US 9,755,833 B2
(45) Date of Patent: Sep. 5, 2017

(54) IDENTIFICATION INFORMATION MANAGEMENT SYSTEM, METHOD OF GENERATING AND MANAGING IDENTIFICATION INFORMATION, TERMINAL, AND GENERATION AND MANAGEMENT PROGRAMS

(75) Inventor: Hiroshi Kitamura, Tokyo (JP)

(73) Assignee: NEC Corporation, Tokyo (JP)

(*) Notice: Subject to any disclaimer, the term of this patent is extended or adjusted under 35 U.S.C. 154(b) by 542 days.

(21) Appl. No.: 13/132,738

(22) PCT Filed: Dec. 3, 2009

(86) PCT No.: PCT/JP2009/006597
§ 371 (c)(1),
(2), (4) Date: Jun. 3, 2011

(87) PCT Pub. No.: WO2010/064439
PCT Pub. Date: Jun. 10, 2010

(65) Prior Publication Data
US 2011/0241825 A1    Oct. 6, 2011

(30) Foreign Application Priority Data

Dec. 3, 2008  (JP) ................................ 2008-308130

(51) Int. Cl.
*H04L 29/06* (2006.01)
*H04L 9/32* (2006.01)
*H04L 29/12* (2006.01)

(52) U.S. Cl.
CPC ........ *H04L 9/3236* (2013.01); *H04L 29/1232* (2013.01); *H04L 61/2092* (2013.01); *H04L 2209/42* (2013.01)

(58) Field of Classification Search
CPC ... H04L 67/14; H04L 65/1069; H04L 67/141; H04L 67/142; H04L 63/0876; H04L 67/1023
(Continued)

(56) References Cited

U.S. PATENT DOCUMENTS 6,079,021 A *  6/2000  Abadi et al. ..................... 726/14
6,539,494 B1 *  3/2003  Abramson ............ G06F 11/203
                                                          714/4.3
(Continued)

FOREIGN PATENT DOCUMENTS

EP          1873674 A1 *  1/2008
JP       2001-251295 A     9/2001
(Continued)

OTHER PUBLICATIONS

EJ Jung, Hash Functions, Sep. 6, 2010, University of San Fransico, 15 Pages total, http://www.cs.usfca.edu/~ejung/courses/686/lectures/05hash.pdf.*

(Continued)

*Primary Examiner* — Farid Homayounmehr
*Assistant Examiner* — Christopher C Harris
(74) *Attorney, Agent, or Firm* — McGinn IP Law Group, PLLC

(57) ABSTRACT

An identification information management system according to the present invention comprises a plurality of terminals communicable with servers and a site management apparatus which manages site containing the terminals. The terminal has an identification information processing unit which assuming that a one-way hash function is f(x) and a terminal-unique ID is a, generates values x satisfying a conditional equation f(x)=a as identification information. When acquiring multiple items of identification information, the site management apparatus substitutes the identification (Continued)

information as the value x into f(x) and decides whether f(x)=a is satisfied, thereby deciding the terminals.

26 Claims, 6 Drawing Sheets

(58) Field of Classification Search
USPC .............................. 709/223; 726/5; 713/155
See application file for complete search history.

(56) References Cited

U.S. PATENT DOCUMENTS

| | | | | |
|---|---|---|---|---|
| 2003/0172159 | A1* | 9/2003 | Schuba | H04L 63/1458 709/225 |
| 2004/0128376 | A1* | 7/2004 | Matsune et al. | 709/223 |
| 2006/0075106 | A1* | 4/2006 | Hochmuth | H04L 67/125 709/227 |
| 2006/0117175 | A1* | 6/2006 | Miura et al. | 713/155 |
| 2007/0180247 | A1* | 8/2007 | Leech | H04L 63/0209 713/171 |
| 2007/0214165 | A1* | 9/2007 | Hidaka | H04L 67/14 |
| 2007/0234409 | A1* | 10/2007 | Eisen | H04L 63/0876 726/6 |
| 2008/0092218 | A1* | 4/2008 | Yao | 726/5 |
| 2008/0189772 | A1* | 8/2008 | Sims et al. | 726/5 |
| 2009/0150485 | A1* | 6/2009 | Kawabata | H04L 63/0815 709/203 |

FOREIGN PATENT DOCUMENTS

| | | |
|---|---|---|
| JP | 2005-149437 A | 6/2005 |
| JP | 2006-011833 A | 1/2006 |
| JP | 2007-325218 A | 12/2007 |
| JP | 2007-336127 A | 12/2007 |

OTHER PUBLICATIONS

Murat Kantarcioglu, Cryptographic Hash Functions, Feb. 10, 2009, UTD, 15 Pages Total, http://www.utdallas.edu/~muratk/courses/crypto09s_files/hash.pdf.*

Wikipedia, Preimage Attacks, Feb. 21, 2015, 1 page.*

Menezes et al., A handbook for applied cryptography, Aug. 2001, CRC Press, p. 327.*

Kitamura et al. "A Unified Multiplex Communication Architecture to Innovate IP Communication Styles", The Institute of Electronics, Information and Communication Engineers, Technical Committee on Information Networks, Mar. 2007.

Japanese Office Action dated Oct. 1, 2013 with partial English translation thereof.

* cited by examiner

FIG. 5

|  | HASH FUNCTION | FIXED ID (HASH VALUE) | IDENTIFICATION INFORMATION GROUP TO BE USED AND CONDITIONAL EQUATION TO BE MET |
|---|---|---|---|
| TERMINAL A | p(x) | a | x MEETING p(x) = a |
| TERMINAL B | q(x) | b | x MEETING q(x) = b |
| TERMINAL C | r(x) | c | x MEETING r(x) = c |
| ... |  |  |  |

FIG. 7

| | SALT | HASH FUNCTION | FIXED ID (HASH VALUE) | IDENTIFICATION INFORMATION GROUP TO BE USED AND CONDITIONAL EQUATION TO BE MET |
|---|---|---|---|---|
| TERMINAL A | u | $p(x)=f(u|x)$ | a | x MEETING $f(u|x) = a$ |
| TERMINAL B | v | $q(x)=f(v|x)$ | b | x MEETING $f(v|x) = b$ |
| TERMINAL C | w | $r(x)=f(w|x)$ | c | x MEETING $f(w|x) = c$ |
| ... | | | | |

IDENTIFICATION INFORMATION MANAGEMENT SYSTEM, METHOD OF GENERATING AND MANAGING IDENTIFICATION INFORMATION, TERMINAL, AND GENERATION AND MANAGEMENT PROGRAMS

The present application claims a priority based on Japanese Patent Application 2008-308130 filed on Dec. 3, 2008, the entirety of which is incorporated herein.

TECHNICAL FIELD

The present invention relates to an identification information management system, a method of generating identification information, a method of managing identification information, a terminal, a generation program, and a method of managing a management program, and particularly to an identification information management system which generates and manages identification information for terminals, a method of generating identification information, a method of managing identification information, a terminal, a generation program and a management program.

BACKGROUND ART

In information communication systems, identification information is assigned to each terminal in order to identify terminals. For the identification information assignment system, there is widely used a system which assigns a single and fixed item of identification information to each terminal. However, the assignment system is not accurate in terms of security such as privacy protection.

For one of the systems excellent in security, there is proposed a so-called disposable system which does not use identification information used for one session in the next session (see Non-Patent Literature 1). According to the system, many items of dynamically-changing identification information are used, thereby achieving privacy protection.

[Non-Patent Document 1] Kitamura, Ata, Murata, "A Unified Multiplex Communication Architecture to Innovate IP Communication Styles", The Institute of Electronics, Information and Communication Engineers, Technical Committee on Information Networks, March, 2007

DISCLOSURE OF THE INVENTION

According to a system using many items of dynamically-changing identification information, if simple and ruleless random number information is used for identification information, anonymity can be provided. However, in a management apparatus which manages terminals, each terminal cannot be identified based on the identification information, and it is difficult to decide which identification information is used at the same terminal.

Further, in the management apparatus, even when all communication packets flowing over a network are acquired to manage a correspondence relationship between a terminal and identification information assigned to the terminal, it is difficult to decide which terminal uses the identification information from among the identification information contained in the acquired communication packets or to decide which identification information is used at the same terminal.

There is not specifically proposed in Non-Patent Literature 1 what is used as identification information or how to generate identification information in the system using many items of dynamically-changing identification information.

Further, when many items of dynamically-changing identification information are set for the terminals, unchanged and fixed identification information is preferable for each terminal to identify and manage the terminals in the management apparatus, but no specific proposal is made for what is used for the fixed identification information and how to assign the same.

Furthermore, in order to achieve a system capable of managing each terminal based on identification information in the management apparatus, both the terminal and the management apparatus require registration processing for previously sharing many items of information, which is complicated.

As described above, the identification information management system in the related art has not been sufficient to satisfy both anonymity and manageability.

It is an object of the present invention to provide an identification information management system, a method of generating identification information, a method of managing identification information, a terminal, a generation program and a management program capable of satisfying both anonymity and manageability.

According to the present invention, there is provided an identification information management system which manages identification information for terminals, wherein assuming that a one-way hash function is $f(x)$ and a terminal-unique ID is a, alues x satisfying a conditional equation $f(x)=a$ are assumed as identification information for the terminals.

According to the present invention, there is provided an identification information management system comprising a plurality of terminals communicable with servers and a site management apparatus which manages a site containing the terminals, wherein the terminal has an identification information processing unit which assuming that a one-way hash function is $f(x)$ and a terminal-unique ID is a, generates values x satisfying conditional equation $f(x)=a$ as identification information, and the site management apparatus has an identification information deciding unit which, when acquiring multiple items of identification information, substitutes the identification information as the value x into $f(x)$ and decides whether $f(x)=a$ is satisfied, thereby deciding the terminals.

According to the present invention, there is provided an identification information management system comprising a plurality of terminals communicable with servers and a site management apparatus which manages a site containing the terminals, wherein the terminals each have an identification information processing unit which assuming that a one-way hash function common among the terminals is $f(x)$ and a terminal-unique ID is a, generates values x satisfying conditional equation $f(x)=a$ as identification information, and the site management apparatus has an identification information deciding unit which, when acquiring multiple items of identification information, substitutes the identification information as the value x into $f(x)$ to find the solutions of $f(x)$ and decides the identity of the terminals based on an identity of the solutions.

According to the present invention, there is provided a method of generating identification information for terminals, comprising selecting candidates for identification information, calculating hash values by substituting the selected candidates into a one-way hash function $f(x)$ preset for the terminals, comparing whether the calculated hash values are equal to a as unique IDs preset for the terminals, and as a result of the comparing, when the hash values are equal to a, deciding the candidates as identification information.

According to the present invention, there is provided a method of managing identification information for terminals, comprising acquiring identification information, selecting a one-way hash function set for any terminal, calculating a hash value by substituting the identification information into the selected one-way hash function, comparing whether the calculated hash value is equal to a unique ID preset for the terminal, and as a result of the comparing, when the hash value is equal to the unique ID, deciding the identification information as identification information for the terminal.

According to the present invention, there is provided a method of managing identification information for terminals, comprising acquiring identification information, calculating hash values by substituting the identification information into a one-way hash function common among a plurality of terminals, and comparing whether the calculated hash values are equal to other hash values, and as a result of the comparing, when the calculated hash values are equal to other hash values, deciding that the terminals for the respective hash values are the same.

According to the present invention, there is provided a terminal comprising an identification information processing unit which assuming that a one-way hash function is f(x) and a terminal-unique ID is a, generates a value x satisfying a conditional equation f(x)=a as identification information, and an identification information storing unit which stores the identification information generated by the identification information processing unit.

According to the present invention, there is provided a program of generating identification information for terminals, which causes a computer to perform selecting candidates for identification information, calculating hash values by substituting the selected candidates into a one-way hash function f(x) preset for the terminals, comparing whether the calculated hash values are equal to a as unique IDs preset for the terminals, and as a result of the comparing, when the calculated hash values are equal to a, deciding the candidates as identification information.

According to the present invention, there is provided a program of managing identification information for terminals, which causes a computer to perform acquiring identification information, selecting a one-way hash function preset for any of the terminals, calculating hash values by substituting the identification information into the selected one-way hash function, comparing whether the calculated hash value is equal to a unique ID preset for the terminal, and as a result of the comparing, when the calculated hash value is equal to the unique ID, deciding the identification information as identification information for the terminal.

According to the present invention, there is provided a program of managing identification information for terminals, which causes a computer to perform acquiring identification information, calculating hash values by substituting the identification information into a one-way hash function common among a plurality of terminals, comparing whether the calculated hash values are equal to other hash values, and as a result of the comparing, when the calculated hash values are equal to other hash values, deciding that the terminals for the respective hash values are the same.

According to the present invention, it is possible to provide an identification information management system, a method of generating identification information, a method of managing identification information, a terminal, a program of generating identification information, and a program of managing identification information capable of satisfying both anonymity and manageability.

BRIEF DESCRIPTION OF THE DRAWINGS

FIG. 5 is a table indicating a correspondence relationship between a terminal, and a hash function and a fixed ID in the identification information management system according to the first embodiment of the present invention.

FIG. 7 is a table indicating a relationship when salt is introduced as a realized form of the hash function of FIG. 5.

BEST MODES FOR CARRYING OUT THE INVENTION

First Embodiment

The best modes for carrying out the present invention will be described in detail with reference to the drawings.

Figure 1:
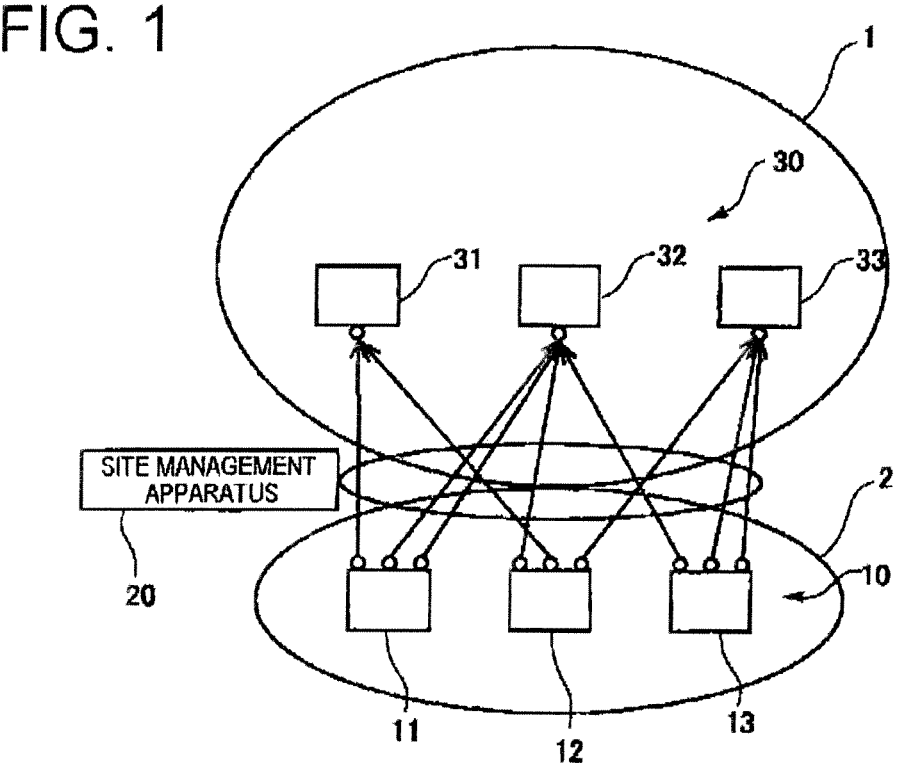
FIG. 1 is a structure diagram showing a structure of an identification information management system according to a first embodiment of the present invention.

FIG. 1 is a system structure diagram showing the entire structure of an identification information management system according to a first embodiment. As illustrated, the identification information management system includes a terminal 10, a site management apparatus 20, and a server 30.

The terminal 10 is provided in a site 2 and is connected to the server 30 via a communication network such as Internet 1. The site is one management unit in the communication network. In other words, the terminal 10 and the like belonging to the same site are managed by the same site management apparatus 20. The identification information management system includes a plurality of terminals 11, 12, 13. In FIG. 1, the terminal 11 is connected to a server 31 and a server 32, the terminal 12 is connected to the server 31, the server 32 and a server 33, and the terminal 13 is connected to the server 32 and the server 33.

Figure 2:
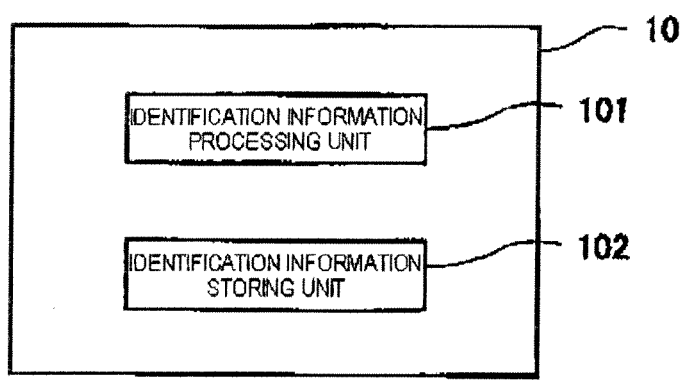
FIG. 2 is a block diagram showing a structure of a terminal in the identification information management system according to the first embodiment of the present invention.

The terminal 10 is various communication apparatuses such as a computer with communication function, a portable terminal and a cell phone. The terminal 10 according to the first embodiment includes an identification information processing unit 101 and an identification information storing unit 102 as shown in FIG. 2.

The identification information processing unit 101 includes a function of generating identification information which uniquely identifies terminals, a function of setting the identification information to each terminal, and a function of expending the identification information. Herein, the identification information is a terminal address, for example. The identification information processing unit 101 has hardware configurations such as a CPU (Central Processor Unit), ROM and RAM, and is configured in cooperation with computer programs for achieving the functions.

Herein, the identification information is a value satisfying the conditional equation f(x)=a, where a one-way hash function is f(x) and a terminal-unique ID is a. The methods of generating and managing the identification information will be described later in detail.

The identification information storing unit 102 functions as an identification information pool.

Specifically, the identification information storing unit 102 stores the identification information generated by the identification information processing unit 101. The identification information processing unit 101 includes memories such as a hard disk device and a RAM.

The site management apparatus 20 a site containing the terminal 10, and includes a computer with communication function, for example.

Figure 3:
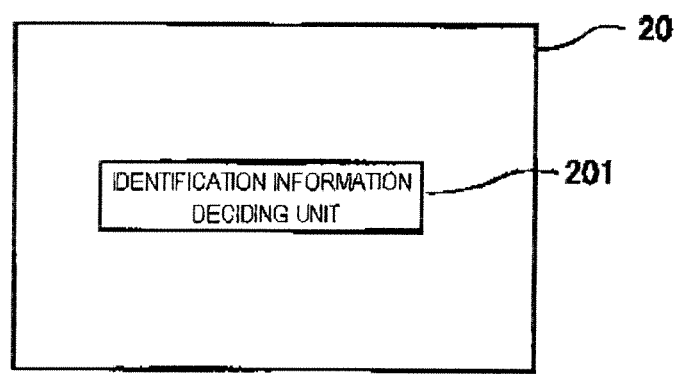
FIG. 3 is a block diagram showing a structure of a site management apparatus in the identification information management system according to the first embodiment of the present invention.

The site management apparatus 20 according to the first embodiment has a function of acquiring the identification information on the terminal 10 from communication packets exchanged between each terminal 10 and the server 30, and managing the identification information assigned to each terminal 10. The site management apparatus 20 includes an identification information deciding unit 201 as shown in FIG. 3. The identification information deciding unit 201 specifies the terminal 10 assigned with the identification information based on the identification information, or when acquiring multiple items of identification information, decides whether the items of identification information are used at the same terminal 10. The identification information deciding unit 201 according to the first embodiment stores unique IDs corresponding to the respective terminals 10 in the storing unit. The unique IDs are previously registered in the identification information deciding unit 201.

The server 30 is a server computer provided over Internet, and has a function of communicating with the terminals 10 via a communication network such as Internet 1.

Subsequently, the operations of the identification information management system according to the first embodiment will be described.

When establishing a communication session with any server 30, the terminal 10 generates and sets its own identification information by the identification information processing unit 101. The identification information may be generated at the time of the establishment of establishing the communication session, or may be generated before the establishment of the communication session to be stored in the identification information storing unit 102. When the identification information is generated before the establishment of the communication session to be stored in the identification information storing unit 102, the identification information is read out from the identification information storing unit 102 at the time of the establishment of the session to perform the setting processing. The identification information processing unit 101 recognizes an establishment timing or an end timing of the communication session in response to a notification from a communication processing unit (not shown).

When recognizing the end of the session in response to a notification from the communication processing unit (not shown), the identification information processing unit 101 discards the identification information.

The identification information processing unit 101 generates identification information with respect to each session. For example, when the terminal 11 establishes sessions with the servers 31 and 32, the identification information on the terminal 11 used for the session between the terminal 11 and the server 31 is different from the identification information on the terminal 12 used for the session between the terminal 11 and the server 32. When a plurality of sessions are established between one terminal and one server, the identification information used at the terminal for the respective sessions is different. In other words, the identification information used at the terminal with respect to each session is different irrespective of which server is a connection destination server. For example, as shown in FIG. 1, the terminal 13 establishes multiple sessions with the server 33, and the different identification information 13 is respectively set for the multiple sessions.

The terminal 10 contains the identification information in communication packets by the communication processing unit (not shown). The communication processing unit of the terminal 10 transmits the communication packets containing the identification information on the terminal 10 to the server 30 with which the session is established. The server 30 receives the communication packets transmitted from the terminal 10 via a communication network such as Internet 1, acquires and recognizes the identification information on the terminal 10 from the received communication packets.

A site management apparatus 200 acquires the communication packets containing the identification information on the terminal 10 by the communication processing unit (not shown). The site management apparatus 200 acquires the identification information on the terminal 10 from the communication packets by the identification information deciding unit 201, and performs processing of identifying which terminal is the terminal 10 assigned with the identification information based on the acquired identification information. When acquiring multiple items of identification information from the communication packets, the identification information deciding unit 201 makes a decision as to whether the items of identification information are assigned to the same terminal 10 based on the items of identification information.

Next, processing of generating the identification information performed by the identification information processing unit 101 of the terminal 10 will be described in detail.

The generation of the identification information uses a one-way hash function f(x). However, the generation of the identification information does not utilize a typical hash function which assumes the values obtained from the hash function as the identification information (f(x)=identification information). In the present embodiment, the generation of the identification information is performed by finding x satisfying f(x)=a (fixed value). The found x is used as the identification information, There exist multiple values x satisfying f(x)=a in consideration of the nature of the hash function. The values x are assigned to the respective sessions established at the same terminal. The identification information expended at the same terminal have the common nature that f (identification information)=a is satisfied. The nature is used for deciding whether multiple items of identification information are generated from the same terminal.

The one-way hash function f(x) is characterized by not having an inverse function. Thus, the values x satisfying f(x)=a cannot be found by the inverse function. According to the present invention, the values x are found by a heuristic method (that is, a try and error method).

Figure 4:
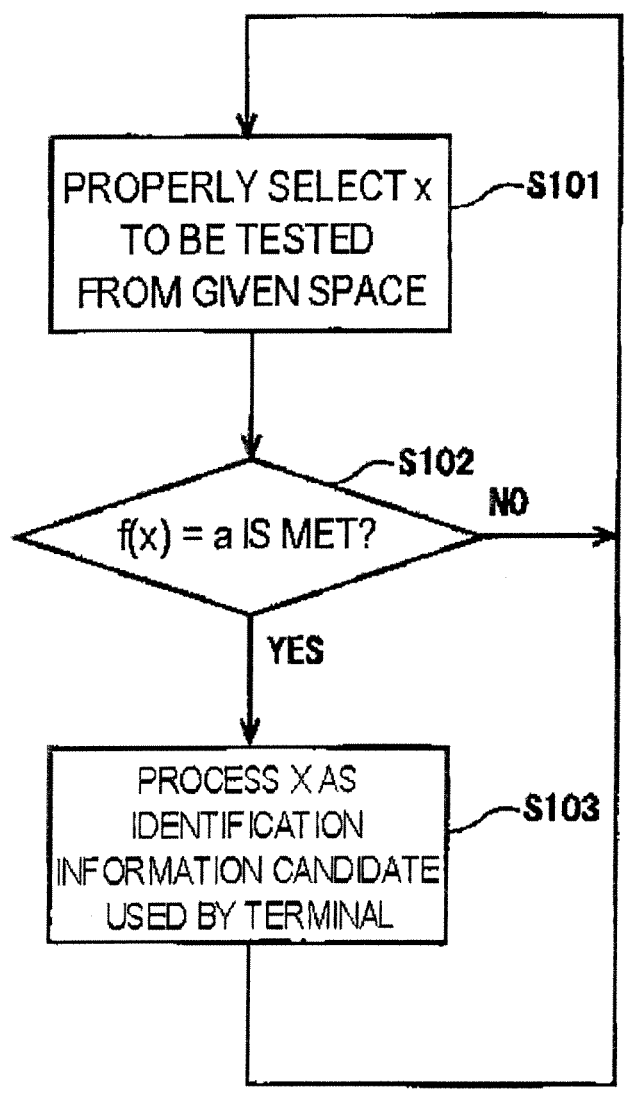
FIG. 4 is a flowchart showing a processing flow of the identification information management system according to the first embodiment of the present invention.

Processing of calculating the value x will be described with reference to the flowchart of FIG. 4. Firstly, the identification information processing unit 101 selects, in an arbitrary manner, the value x (such as an address) from a space (such as address space) previously given as a range in which the identification information is permitted (S101). The selection of the value x may be performed randomly, or may be performed based on a predetermined algorithm.

Then, the identification information processing unit 101 decides whether the selected value x satisfies f(x)=a (S102). When deciding that the value x satisfies f(x)=a, the identification information processing unit 101 sets the vale x for a candidate to be used later as the identification information by the terminal (S103). When the identification information is stored in the identification information storing unit 102 and then used, the value x is stored in the identification information storing unit 101 and the processing returns to the first processing (S101) to repeatedly retrieve a next identification information candidate. On the other hand, when deciding that the value x does not satisfy f(x)=a, the identification information processing unit 101 does not contain the value x in the candidates, and the processing returns to the first processing (S101) to retrieve a next identification information candidate.

In the first embodiment, the one-way hash function f(x) used for generating the identification information may have a highly special nature used for a public key encoding system or may be a typical hash function. The definition of the hash function is various but the hash function according to the first embodiment of the present invention is the one-way hash function for which an inverse function is not present in which the hash values are substantially uniformly distributed. The nature is remarkably typical of the hash function.

The one-way hash function f(x) is known not only to the terminal 10 which uses the function to generate the identification information but also the site management apparatus 200 of a manager of the site to which the terminal 10 belongs, but is not known to the server 30 outside the site. Thus, the server 30 cannot know the common nature of the identification information used at the terminal 10 that the identification information used at one terminal, is substituted into the one-way hash function f(x) to be the same hash value. Therefore, classification or distinction cannot be made and thus anonymity of the terminal can be secured for the server 30.

The site management apparatus 20 which manages the site to which the terminal 10 belongs holds the information on the one-way hash function f(x). When the site management apparatus 20 acquires multiple items of identification information, if the solutions obtained by substituting the items of identification information as the value x into the one-way hash function f(x) have the same value, the sessions using the identification information having the same value are highly likely to be the sessions originating from the same terminal.

As shown in FIG. 5, in the identification information management system according to the first embodiment, the one-way hash function used for generating the identification information is different with respect to each terminal. In the example shown in FIG. 5, a terminal A, a terminal B and a terminal C use p(x), q(x) and r(x), respectively, to generate the identification information. The hash value obtained by substituting the identification information used at each terminal into each hash function is a fixed value. The hash value represents each terminal, and is called a unique ID in the first embodiment. The unique ID according to the first embodiment is a fixed value different with respect to each terminal such as a for the terminal A, b for the terminal B and c for the terminal C.

In other words, the identification information x used by the terminal A is a value satisfying the conditional equation p(x)=a, the identification information x used by the terminal B is a value satisfying the conditional equation q(x)=b, and the identification information x used by the terminal C is a value satisfying the conditional equation r(x)=c.

Figure 6:
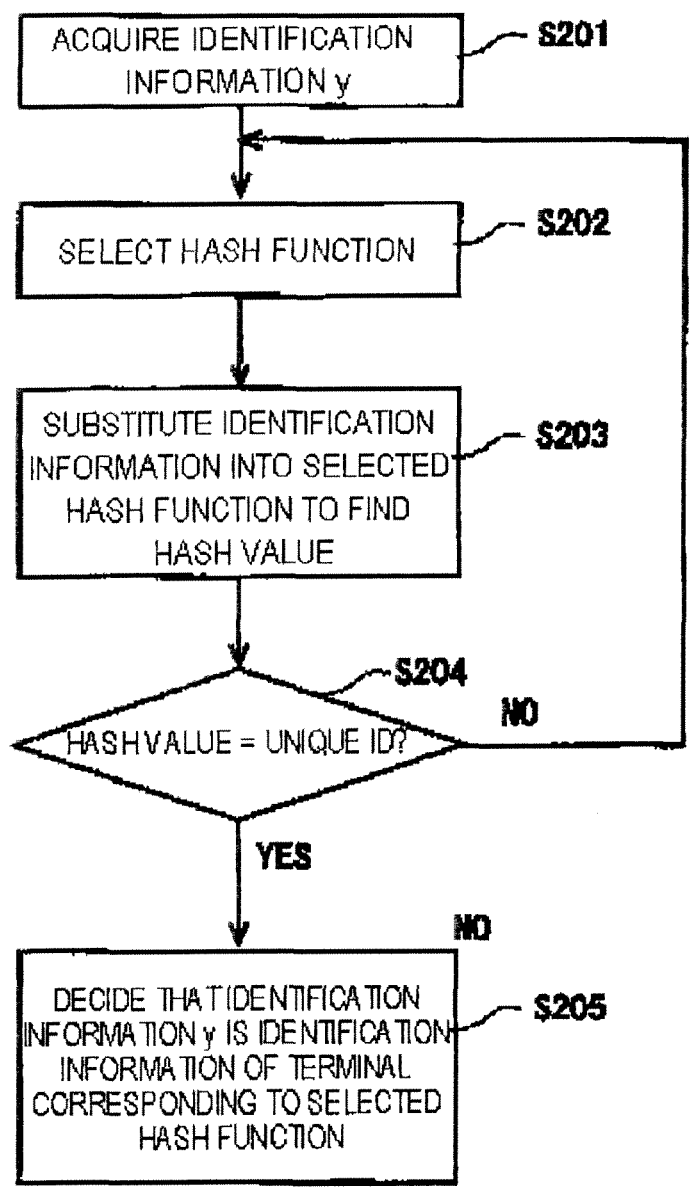
FIG. 6 is a flowchart showing a processing flow of the identification information management system according to the first embodiment of the present invention.

With the flowChart of FIG. 6, there will be described a method of deciding a terminal using identification information y when the site management apparatus 200 acquires the identification information y. Firstly, the identification information deciding unit 201 of the site management apparatus 200 acquires the identification information y (S201). Next, the identification information deciding unit 201 of the site management apparatus 200 selects a hash function of any terminal for retrieval (S202).

The identification information deciding unit 201 of the site management apparatus 200 substitutes the identification information y into the selected hash function to find the hash value (S203).

Then, the identification information deciding unit 201 decides whether the found hash value is equal to the unique ID for the hash function (S204). As a result, when it is decided that the found hash value is equal to the unique ID for the hash function, the identification information y is decided as identification information of the terminal corresponding to the hash function selected in step S202 (S205). As a result, when it is decided that the found hash value is different from the unique ID for the hash function, a different hash function is selected in step S202 to repeat the same processing (S203 to S205).

For example, the identification information deciding unit 201 sequentially checks whether the identification information y satisfies such as p(y)=a, q(y)=b and r(y)=c. If the identification information y satisfies any of the conditional equations such as p(y)=a, q(y)=b and r(y)=c, the terminal using the hash function and the unique ID is a terminal being retrieved.

From the natures of the hash function and the conditional equation, even if the identification information y satisfies one conditional equation, it does not mean that other equations are not satisfied. When a plurality of conditional equations are satisfied, it means that the terminals being retrieved are narrowed down to a definite number of terminals.

A plurality of completely-different hash functions do not need to be prepared with respect to each terminal as the above. For example, one hash function is to be prepared and a plurality of hash functions may be substantially prepared by using a function called salt.

As shown in FIG. 7, a different value with respect to each terminal is set as salt. In the first embodiment, the terminal A, the terminal B, and the terminal C set u, v and w as salt, respectively. When the prepared hash function is f(x), the respective conditional equations can be expressed with p(x)=f(u|x), q(x)=f(v|x), and r(x)=f(w|x).

There will be described a method of, when the site management apparatus 200 acquires identification information y, deciding a terminal using the identification information y. The identification information deciding unit 201 of the site management apparatus 200 substitutes the identification information y into the hash function used by the terminal within the site to find a hash value. For example, the identification information deciding unit 201 sequentially checks whether the identification information y satisfies such as f(u|y)=a, f(v|y)=b and f(w|y)=c. If the identification information y satisfies any of the conditional equations such as f(u|y)=a, f(v|y)==b and f(w|y)=c, the terminal using the hash function and the fixed ID is a terminal being retrieved.

The following advantages can be obtained by the identification information management system according to the first embodiment.

Firstly, multiple items of identification information transmitted from the same terminal are unrelated information with anonymity for the nodes outside the site which do not know the one-way hash function used by the terminal for generating the identification information, but the manager of the site having the information on which hash function is used, that is, the site management apparatus 200 can use the hash function to know the relationship among the items of identification information, and can decide whether the multiple items of given identification information are generated from the same terminal.

Secondly, the identification information to be used is unrelated information with anonymity for the nodes outside the site which do not know the one-way hash function used by the terminal for generating the identification information, but the site manager knowing which hash function is used can use the hash function to know the nature of the identification information, and can know from which terminal the given identification information is generated or whether the given identification information is generated from a definite number of terminals.

Thirdly, even if the one-way hash function having no highly special nature is used, the identification information can be generated, and the manager can use the identification information to manage the terminals. This is because only typical functions are required for the hash function to be used.

Fourthly, if the same hash function is permitted to use within the site, it is only necessary to register which hash function is to be used to achieve the terminal management system which sets many items of dynamically-changing identification information for the terminals, and apart from this, nothing is necessary to be additionally registered or previously performed, Second Embodiment An identification information management system according to a second embodiment will be described below.

In the identification information management system according to the first embodiment of the present invention, a different hash function is used with respect to each terminal. A different hash function is used with respect to each terminal in this way mainly because if the hash function is known to other terminals except for the manager, the other terminals knowing the function can spoof with a high possibility. On the other hand, if a different hash function is used with respect to each terminal, processing using multiple hash functions needs to be performed in the terminal deciding processing based on the identification information by the site management apparatus, and thus the processing is complicated.

In the identification information management system according to the second embodiment, all the terminals within the same site use the exactly common hash function. In such an actual use, spoofing cannot be prevented among the terminals within the same site. The second embodiment is applied to an environment in which such spoofing does not matter. In the identification information management system according to the second embodiment, the unique ID of the terminal 10 does not need to be previously registered in the site management apparatus 20.

In this manner, when the unique ID of the terminal 10 is not previously registered in the site management apparatus 20, the hash values calculated based on the identification information are not compared with the unique ID in the deciding processing by the identification information deciding unit 201 of the site management apparatus 20, but are compared with a hash value calculated based on other identification information. A comparison is made as to whether the calculated hash values are equal to other hash values, and as a result of the comparison, when the calculated hash values are equal to other hash values, the terminals for the respective hash values are the same.

In other words, when acquiring multiple items of identification information, the identification information deciding unit 201 of the site management apparatus 20 according to the second embodiment substitutes the identification information as the value x into f(x) to find the solutions of f(x). Then, the identification information deciding unit 201 decides the identity of the terminals 10 based on the identity of the solutions.

In this manner, the identification information management system according to the second embodiment in which all the terminals within the site use exactly the same hash function (such as f(x)) obtains the following advantages.

Since one hash function is used within the site, the processing by the site management apparatus is simplified. In other words, when acquiring identification information y for retrieving a terminal using y, the site management apparatus 200 only has to make a calculation to find the value of f(y) once but does not need to retrieve a plurality of functions or conditional equations unlike the first embodiment. The terminal using the unique ID corresponding to the hash value of f(y) is a terminal being retrieved. If the unique IDs with respect to each terminal do not overlap, a terminal being retrieved can be uniquely selected.

When a terminal generates its own identification information, the heuristic method is employed in the first embodiment, and when the hash value obtained by substituting the identification information to be a candidate into the hash function does not correspond to the unique ID of the terminal, processing of discarding the identification information to be a candidate has been performed. However, if the hash function is the same within the site as in the second embodiment, even when the hash function does not correspond to the unique ID of the terminal, the hash value can be used as the unique ID at other terminals. Therefore, when the processing of generating the identification information whose hash function is shared among all the terminals within the site is performed, the identification information can be generated without performing the processing of discarding the identification information. This advantage is particularly noted when the processing of generating the identification information is performed in the site management apparatus or other apparatuses as described later.

When the hash function is different with respect to each terminal as in the first embodiment, the hash function needs to be transmitted to the site management apparatus and thus the transmitting processing is complicated, but if the same hash function is used within the site as in the present embodiment, the processing is not required.

Processing is required to decide which value is specifically used as the unique ID to be used to each terminal. The processing is complicated but each terminal may freely decide its own unique ID. For example, the unique ID may be decided by a random number, or a hash value obtained by substituting identification information as the first candidate into the hash function may be decided as its own unique ID. The nature of the hash value that the calculated values are substantially uniformly distributed is used, and the hash value has substantially the same effect as the random number. Each terminal may freely use its own unique ID in this way because the nature required for the unique ID is only that the calculated values are sufficiently distributed, the values do not need to be arranged in order and the magnitudes are meaningless.

In order to uniquely identify the terminals from the identification information, it is required that the unique ID of a terminal does not overlap with those of other terminals. To the contrary, in order not to uniquely identify the terminal from the identification information but to narrow down the terminals to a definite number of candidates, the unique ID of a terminal may overlap with those of other terminals. When the space (such as address space) previously given as the range in which the identification information is permitted is a definite space and only unique IDs with no overlaps are permitted, the number of terminals to be accommodated can be obtained by simple calculation. The number of terminals to be accommodated can be increased by permitting the unique IDs to overlap.

When the unique ID of a terminal is generated by a random number, the unique ID is less likely to overlap. However, even if overlapping occurs, it does not lead to a critical problem, and the terminals may be narrowed down to a definite number of candidates when the terminals are identified from the identification information.

When all the terminals within the site use exactly the same hash function, the processing therefor is simplified and made efficient both at the terminals and at the manager, thereby facilitating mounting or achieving therefor. If knowing which hash function is virtually used within the site, the system can use the hash function without the need of other complicated registration processing and the like in advance.

Other Embodiments

The identification information processing unit 101 and the identification information storing unit 102 are provided in the terminal 10 in the first and second embodiments of the present invention, but not limited therein, they may be also provided in the site management apparatus 20 or other apparatuses, and may give generated identification information to the terminals. The identification information deciding unit 201 may be provided in the terminal 10 or the server 30, not in the site management apparatus 20.

The terminal 10 or the site management apparatus 20 according to the first and second embodiments of the present invention can be configured by installing the computer programs for realizing each processing, and operating the computer by the programs. At this time, the programs may be stored in various kinds of storage media and may be transmitted via a communication medium. The storage medium includes a flexible disk, a hard disk, a magnetic disk, a magnetooptical disk, a CD-ROM, a DVD, a ROM cartridge, a RAM memory cartridge with battery backup, a flash memory cartridge, and a nonvolatile RAM cartridge, for example. The communication medium includes a wired communication medium such as a telephone line, a wireless communication medium such as a microwave line, and the Internet.

The invention claimed is:

1. An identification information management system, which manages identification information for terminals, comprising:
    an identification information processing unit provides anonymity of the identification information by performing:
    determining a first value of "x" that satisfies a conditional equation "f(x)=a", the function "f" being a one-way hash function, the value of "a" being a terminal-unique ID (identification) that is uniquely allocated to a terminal in advance; and
    using the first value of "x" as a first session identifier that identifies a first communication session, the terminal-unique ID of which is "a",
    determining a second value of "x" that satisfies the same conditional equation "f(x)=a", the function "f" being the same one-way hash function, the value of "a" being the same terminal-unique ID (identification) that is uniquely allocated to the terminal in advance; and
    using the second value of "x" as a second session identifier that identifies a second communication session, the terminal-unique ID of which is "a",
    wherein the first and the second communication sessions are different;
    wherein the determination of the first and second value of "x" includes selecting a candidate value of "x" from a pre-determined value space until "f(x)=a" is satisfied with one of the candidate values of "x",
    wherein the identification information processing unit comprises a circuit, and
    wherein when establishing a communication session with any server or an apparatus, the terminal or a second apparatus generates and sets its own identification information by the identification information processing unit from the determination of the value of "x".

2. The identification information management system as claimed in claim 1,
    wherein said identification information processing unit performs processing of deciding whether the conditional equation f(x)=a is satisfied by substituting selected candidate values of "x" and repeats said deciding processing by changing the selected candidate value of "x" until the conditional equation is satisfied, thereby finding the values "x" as identification information for said terminals.

3. The identification information management system as claimed in claim 2, wherein said identification information processing unit is provided in said terminal.

4. The identification information management system as claimed in claim 1, wherein the respective values "x" satisfying the conditional equation f (x) =a are set for a plurality of sessions established for a same terminal, respectively.

5. The identification information management system as claimed in claim 1, wherein a same one-way hash function is set for a plurality of said terminals.

6. The identification information management system as claimed in claim 1, wherein a different one-way hash function is set with respect to each terminal.

7. The identification information management system as claimed in claim 6, wherein said different one-way hash function is configured by setting different salt.

8. The identification management system according to claim 1, wherein the identification information processing unit includes a hardware processor that calculates the solution "x" of the conditional equation f(x)=a.

9. The identification management system according to claim 1,
    wherein the identification processing unit including a processor acquires the identification information, and determines the terminal corresponding to the acquired identification information, and
    wherein each of the terminals has different one-way hash functions.

10. The identification management system according to claim 1,
wherein the identification processing unit including a processor acquires the identification information, and determines the terminal corresponding to the acquired identification information, and
wherein each of the terminals has a same one-way hash function, but has different salts.

11. The identification management system according to claim 1, wherein the identification processing unit including a processor acquires a plurality of different identification information, and determines whether or not the plurality of the different identification information are allocated to different sessions opened by a same terminal.

12. An identification information management system providing anonymity of identification information, comprising:
a plurality of terminals communicable with servers and a site management apparatus which manages a site including said terminals,
wherein said terminal includes an identification information processing unit which performs determining a first value of "x" that satisfies a conditional equation "f(x)=a", the function "f" being a one-way hash function, the value of "a" being a terminal-unique ID (identification) that is uniquely allocated to a terminal in advance, and which performs using the first value of "x" as a first session identifier that identifies a first communication session, the terminal-unique ID of which is "a",
wherein said identification information processing unit determines a second value of "x" that satisfies the same conditional equation "f(x)=a", the function "f" being the same one-way hash function, the value of "a" being the same terminal-unique ID (identification) that is uniquely allocated to the terminal in advance; and
wherein said identification information processing unit uses the second value of "x" as a second session identifier that identifies a second communication session, the terminal-unique ID of which is "a",
wherein the first and the second communication sessions are different; and
said site management apparatus includes a processor configured to provide an identification information deciding unit which, when acquiring multiple items of identification information, substitutes said identification information as the value "x" into f (x) and decides whether f (x)=a is satisfied, thereby deciding said terminals,
wherein the determination of the first and second value of "x" includes selecting a candidate value of "x" from a pre-determined value space until "f(x)=a" is satisfied with one of the candidate values of "x",
wherein the identification information processing unit comprises a circuit, and
wherein when establishing a communication session with any server or an apparatus, the terminal or a second apparatus generates and sets its own identification information by the identification information processing unit from the determination of the value of "x".

13. The identification information management system as claimed in claim 12, wherein said identification information processing unit of said terminal performs processing of substituting selected candidate values of "x" and deciding whether the conditional equation f (x)=a is satisfied, and repeats said deciding processing until the conditional equation is satisfied, thereby finding the candidate values of "x" as identification information.

14. The identification information management system as claimed in claim 12, wherein the respective values x satisfying the conditional equation f (x)=a are set for a plurality of sessions established for a same terminal, respectively.

15. The identification information management system as claimed in claim 12, wherein a same one-way hash function is set for a plurality of said terminals.

16. The identification information management system as claimed in claim 12, wherein a different one-way hash function is set with respect to each terminal.

17. The identification information management system as claimed in claim 16, wherein said different one-way hash function is configured by setting different salt.

18. An identification information management system comprising a plurality of terminals communicable with servers and a site management apparatus which manages a site including said terminals,
wherein said terminals each include:
an identification information processing unit, to provide anonymity of identification information, performs determining a first value of "x" that satisfies a conditional equation "f(x)=a", the function "f" being a one-way hash function, the value of "a" being a terminal-unique ID (identification) that is uniquely allocated to a terminal in advance, and that performs using the first value of "x" as a first session identifier that identifies a first communication session, the terminal-unique ID of which is "a",
wherein said identification information processing unit determines a second value of "x" that satisfies the same conditional equation "f(x)=a", the function "f" being the same one-way hash function, the value of "a" being the same terminal-unique ID (identification) that is uniquely allocated to the terminal in advance; and
wherein said identification information processing unit uses the second value of "x" as a second session identifier that identifies a second communication session, the terminal-unique ID of which is "a",
wherein the first and the second communication sessions are different; and
said site management apparatus includes a processor configured to provide an identification information deciding unit which, when acquiring multiple items of identification information, substitutes said identification information as the value x into f (x) to find solutions of f (x), and decides an identity of transmission sources of said multiple items of identification information based on an identity of said solutions,
wherein the determination of the first and second value of "x" includes selecting a candidate value of "x" from a pre-determined value space until "f(x)=a" is satisfied with one of the candidate values of "x",
wherein the identification information processing unit comprises a circuit, and
wherein when establishing a communication session with any server or an apparatus, the terminal or a second apparatus generates and sets its own identification information by the identification information processing unit from the determination of the value of "x".

19. A method of generating identification information for terminals to provide anonymity of the identification information, comprising:
determining, by an identification information processing unit, a first value of "x" that satisfies a conditional equation "f(x)=a", the function "f" being a one-way hash function, the value of "a" being a terminal-unique ID (identification) that is uniquely allocated to a terminal in advance; and using, by the identification information processing unit, the first value of "x" as a first session identifier that identifies a first communication session, the terminal-unique ID of which is "a", determining a second value of "x" that satisfies the same conditional equation "f(x)=a", the function "f" being the same one-way hash function, the value of "a" being the same terminal-unique ID (identification) that is uniquely allocated to the terminal in advance; and using the second value of "x" as a second session identifier that identifies a second communication session, the terminal-unique ID of which is "a", wherein the first and the second communication sessions are different;

wherein the determination of the first and second value of "x" includes selecting a candidate value of "x" from a pre-determined value space until "f(x)=a" is satisfied with one of the candidate values of "x", wherein the identification information processing unit comprises a circuit, and wherein when establishing a communication session with any server or an apparatus, the terminal or a second apparatus generates and sets its own identification information by the identification information processing unit from the determination of the value of "x".

20. The method of generating identification information as claimed in claim 19, wherein as a result of said comparing, when said hash values are different from "a", other candidates are selected to repeat said hash value calculating, said comparing, and said deciding.

21. A method of managing identification information for terminals to provide anonymity of the identification information, stored in a non-transitory computer readable medium and executed by a computer, the method comprising:

determining, by the computer, a first value of "x" that satisfies a conditional equation "f(x)=a", the function "f" being a one-way hash function, the value of "a" being a terminal-unique ID (identification) that is uniquely allocated to a terminal in advance; and using, by the computer, the first value of "x" as a first session identifier that identifies a first communication session, the terminal-unique ID of which is "a", determining a second value of "x" that satisfies the same conditional equation "f(x)=a", the function "f" being the same one-way hash function, the value of "a" being the same terminal-unique ID (identification) that is uniquely allocated to the terminal in advance; and using the second value of "x" as a second session identifier that identifies a second communication session, the terminal-unique ID of which is "a", wherein the first and the second communication sessions are different;

wherein the determination of the first and second value of "x" includes selecting a candidate value of "x" from a pre-determined value space until "f(x)=a" is satisfied with one of the candidate values of "x", and wherein when establishing a communication session with any server or an apparatus, the terminal or a second apparatus generates and sets its own identification information by the computer from the determination of the value of "x".

22. A method of managing identification information for terminals to provide anonymity of the identification information, stored in a non-transitory computer readable medium and executed by a computer including a processing unit, the method comprising:

determining, by the processing unit, a first value of "x" that satisfies a conditional equation "f(x)=a", the function "f" being a one-way hash function, the value of "a" being a terminal-unique ID (identification) that is uniquely allocated to a terminal in advance; and using, by the processing unit, the first value of "x" as a first session identifier that identifies a first communication session, the terminal-unique ID of which is "a", determining a second value of "x" that satisfies the same conditional equation "f(x)=a", the function "f" being the same one-way hash function, the value of "a" being the same terminal-unique ID (identification) that is uniquely allocated to the terminal in advance; and using the second value of "x" as a second session identifier that identifies a second communication session, the terminal-unique ID of which is "a", wherein the first and the second communication sessions are different;

wherein the determination of the first and second value of "x" includes selecting a candidate value of "x" from a pre-determined value space until "f(x) =a" is satisfied with one of the candidate values of "x", and wherein when establishing a communication session with any server or apparatus, the terminal or a second apparatus generates and sets its own identification information by the processing unit from the determining the value of "x".

23. A terminal comprising:

an identification information processing unit, to provide anonymity of identification information, performs determining a first value of "x" that satisfies a conditional equation "f(x)=a", the function "f" being a one-way hash function, the value of "a" being a terminal-unique ID (identification) that is uniquely allocated to a terminal in advance, and which performs using the first value of "x" as a first session identifier that identifies a first communication session, the terminal-unique ID of which is "a"; and an identification information storing unit which stores said identification information generated by said identification information processing unit, the identification processing unit determines a second value of "x" that satisfies the same conditional equation "f(x)=a", the function "f" being the same one-way hash function, the value of "a" being the same terminal-unique ID (identification) that is uniquely allocated to the terminal in advance; and the identification processing unit uses the second value of "x" as a second session identifier that identifies a second communication session, the terminal-unique ID of which is "a", wherein the first and the second communication sessions are different;

wherein the determination of the first and second value of "x" includes selecting a candidate value of "x" from a pre-determined value space until "f(x)=a" is satisfied with one of the candidate values of "x", wherein the identification information processing unit comprises a circuit, and wherein when establishing a communication session with any server or an apparatus, the terminal or a second apparatus generates and sets its own identification information by the identification information processing unit from the determination of the value of "x".

24. A non-transitory computer readable medium including a program of generating identification information for terminals to provide anonymity of the identification information, which causes a computer to perform a method comprising:

determining a first value of "x" that satisfies a conditional equation "f(x)=a", the function "f" being a one-way hash function, the value of "a" being a terminal-unique ID (identification) that is uniquely allocated to a terminal in advance from among the terminals;

using the first value of "x" as a first session identifier that identifies a first communication session, the terminal-unique ID of which is "a"; and generating the identification information for the terminals using the value of "x", determining a second value of "x" that satisfies the same conditional equation "f(x)=a", the function "f" being the same one-way hash function, the value of "a" being the same terminal-unique ID (identification) that is uniquely allocated to the terminal in advance; and using the second value of "x" as a second session identifier that identifies a second communication session, the terminal-unique ID of which is "a", wherein the first and the second communication sessions are different;

wherein the determination of the first and second value of "x" includes selecting a candidate value of "x" from a pre-determined value space until "f(x)=a" is satisfied with one of the candidate values of "x", and wherein when establishing a communication session with any server or an apparatus, the terminal or a second apparatus generates and sets its own identification information from the determination of the value of "x".

25. A non-transitory computer readable medium including a program of managing identification information for terminals to provide anonymity of the identification information, which causes a computer to perform a method comprising:

determining a first value of "x" that satisfies a conditional equation "f(x)=a", the function "f" being a one-way hash function, the value of "a" being a terminal-unique ID (identification) that is uniquely allocated to a terminal in advance from among the terminals; and using the first value of "x" as a first session identifier that identifies a first communication session, the terminal-unique ID of which is "a", determining a second value of "x" that satisfies the same conditional equation "f(x)=a", the function "f" being the same one-way hash function, the value of "a" being the same terminal-unique ID (identification) that is uniquely allocated to the terminal in advance; and using the second value of "x" as a second session identifier that identifies a second communication session, the terminal-unique ID of which is "a", wherein the first and the second communication sessions are different;

wherein the determination of the first and second value of "x" includes selecting a candidate value of "x" from a pre-determined value space until "f(x)=a" is satisfied with one of the candidate values of "x", and wherein when establishing a communication session with any server or an apparatus, the terminal or a second apparatus generates and sets its own identification information from the determination of the value of "x".

26. A non-transitory computer readable medium including a program of managing identification information for terminals to provide anonymity of the identification information, which causes a computer to perform a method comprising:

acquiring identification information;

calculating hash values by substituting said identification information into a one-way hash function common among a plurality of terminals;

comparing whether said calculated hash values are equal to other values;

as a result of said comparing, when said calculated hash values are equal to other hash values, deciding that said terminals for said respective hash values are the same;

determining a first value of "x" that satisfies a conditional equation "f(x)=a", the function "f" being a one-way hash function, the value of "a" being a terminal-unique ID (identification) that is uniquely allocated to a terminal in advance from among the terminals; and using the first value of "x" as a first session identifier that identifies a first communication session, the terminal-unique ID of which is "a", determining a second value of "x" that satisfies the same conditional equation "f(x)=a", the function "f" being the same one-way hash function, the value of "a" being the same terminal-unique ID (identification) that is uniquely allocated to the terminal in advance; and using the second value of "x" as a second session identifier that identifies a second communication session, the terminal-unique ID of which is "a", wherein the first and the second communication sessions are different;

wherein the determination of the first and second value of "x" includes selecting a candidate value of "x" from a pre-determined value space until "f(x)=a" is satisfied with one of the candidate values of "x", and wherein when establishing a communication session with any server or an apparatus, the terminal or a second apparatus generates and sets its own identification information from the determination of the value of "x".

* * * * *